Feb. 22, 1966 H. E. BACH 3,236,136
KNIFE FOR CUTTING EXCESS STRIP FROM A SCARF JOINT
Filed Dec. 16, 1963
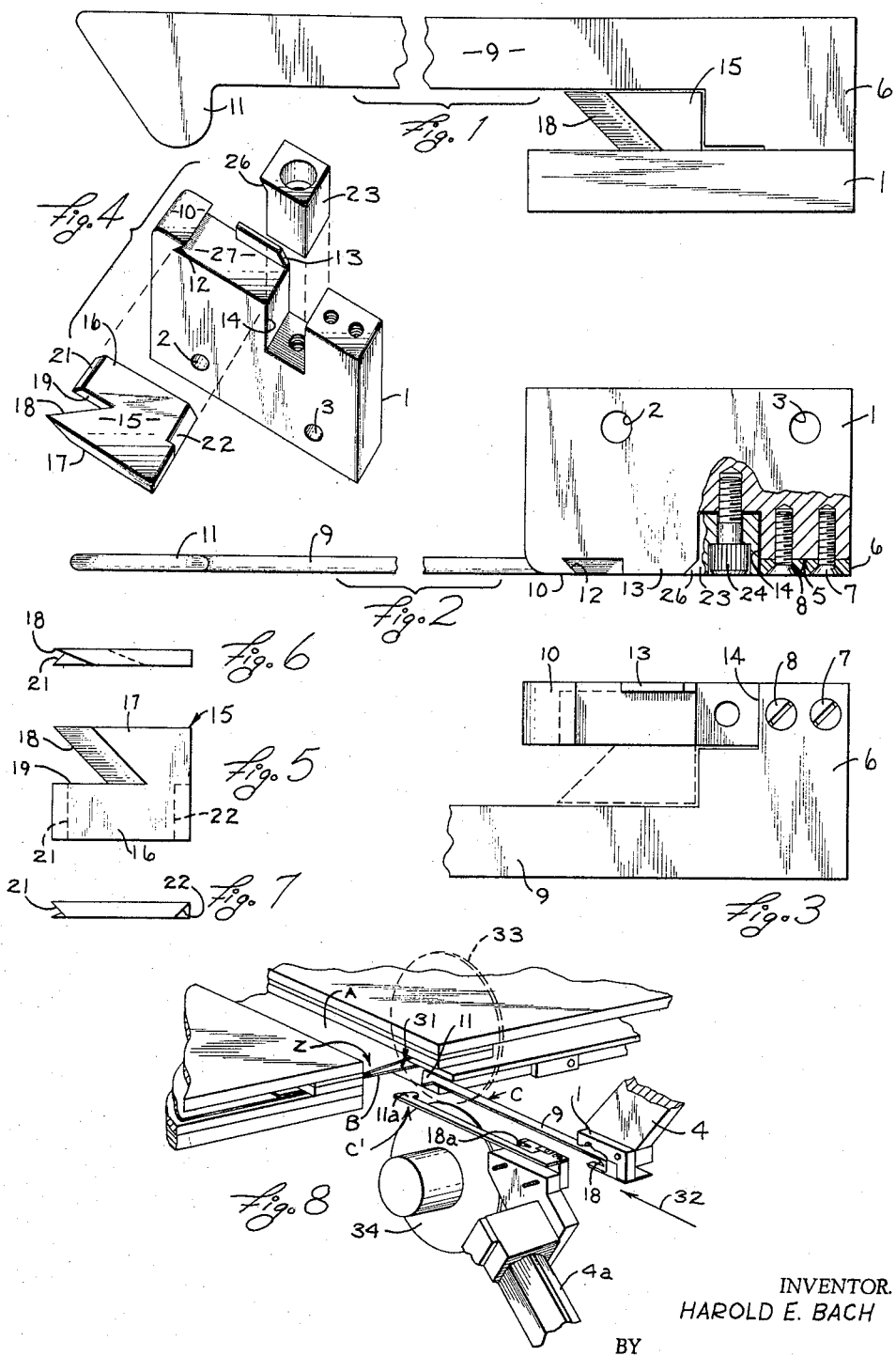
INVENTOR.
HAROLD E. BACH
BY
Woodhams, Blanchard and Flynn
ATTORNEYS

United States Patent Office 3,236,136
Patented Feb. 22, 1966

3,236,136
KNIFE FOR CUTTING EXCESS STRIP FROM A SCARF JOINT
Harold E. Bach, Monitor Township, Bay County, Mich., assignor to National Electric Welding Machines Company, Bay City, Mich., a corporation of Michigan
Filed Dec. 16, 1963, Ser. No. 331,063
5 Claims. (Cl. 83—614)

This invention relates to a metal cutter and it relates particularly to a type of such cutter adapted for joining and trimming successive ends of strip material. Still more particularly, this invention constitutes an improvement over the cutters shown in an application of Heller and Horley, Serial No. 227,446 and in an application of Morley, Nystrom and Ward, Serial No. 323,534, both assigned to the same assignee as the present invention.

In said applications, Serial No. 227,446 and Serial No. 323,534, it has been suggested to join successive ends of strip material, such as strip steel, by overlapping said ends, welding same together and immediately thereafter cutting the free ends of either side of the weld zone. Particularly in this connection, cutting units are provided on the same carriage as that which carries the welding electrodes for both speed and convenience in effecting the cutting immediately following the welding operation. While the subject matter of said applications, Serial No. 227,446 and Serial No. 323,534, is highly effective for carrying out the purposes set forth in said applications, further word with such apparatus has disclosed certain deficiencies in the specific means therein set forth which it is the purpose of the present invention to correct. Particularly, the cutters illustrated in said applications, Serial No. 227,446 and Serial No. 323,534, are difficult to construct to sharpen and to maintain in an effectively sharp condition. Further, where especially thin material is being handled, it sometimes happens that the material is insufficiently stiff to maintain itself properly against the cutting edge of the cutter and this has on occasion resulted in poorly cut, and even torn, areas in the strip material.

Accordingly, the objects of the invention include:

(1) To provide an improved cutter structure effective severing a loose end from a strip of sheet material, such as steel.

(2) To provide a cutter, as aforesaid, which will be inexpensive to manufacture and also inexpensive to maintain in good operating condition.

(3) To provide a cutter, as aforesaid, wherein the cutting edge may be provided on an insert having better edge holding properties than the material from which the rest of the unit is made.

(4) To provide a cutter, as aforesaid, having means assisting the holding of the sheet material in position for effective action thereon by the cutting edge.

(5) To provide a cutter, as aforesaid, particularly adapted for use in the method and apparatus set forth in the above-mentioned Serial No. 227,446 and Serial No. 323,534.

Other objects and purposes of the invention will become apparent to those persons acquainted with methods and apparatus of the present type upon reading the following disclosure and inspection of the accompanying drawings.

In the drawings:

FIGURE 1 is a top view of a cutter embodying the invention.

FIGURE 2 is a partially broken side elevational view of the cutter of FIGURE 1.

FIGURE 3 is a fragmentary bottom view of the cutter of FIGURES 1 and 2.

FIGURE 4 is an oblique view of the mounting block, key and knife separated from the other parts.

FIGURE 5 is a top plan view of the insert on which the cutting edge is provided.

FIGURE 6 is a side view of said insert as shown in FIGURE 5 and showing the side facing FIGURE 6.

FIGURE 7 is a side view of the insert as shown in FIGURE 5 and showing the side facing FIGURE 7.

FIGURE 8 is an oblique view of apparatus utilizing the cutter of the present invention and showing said cutters in position and about to engage sheet material for cutting of same.

In the following specification and claims certain terminology will be used for reference purposes and is not limiting. For example, the terms "forwardly" and "rearwardly" will be used for reference purposes to denote the direction of normal travel of the cutter when operating. The terms "upwardly" and "downwardly" or the terms "top" and "bottom" will refer to the cutter in that position of use occupied by the cutter "C" in FIGURE 8 of the drawings. The terms "inward" and "outward" will refer to the directions toward and away from the geometric center of the device. Terminology other than the terms above mentioned will also include derivatives of the words specifically referred to as well as other words of generally similar import.

Referring now to the drawings, the embodiment of the invention herein selected for illustrative purposes includes a generally rectangular mounting block 1 having side openings 2 and 3 near its upper edge and having recesses hereinafter described in its bottom face for mounting said cutter embodying the invention onto suitable control and actuating means, such as the arm 4 appearing in FIGURE 8.

At the bottom of said block 1 there is provided a first recessed surface 5 and a guide plate 6 which is firmly affixed to said block by suitable means such as the screws 7 and 8. Sufficient of the lower portion of the block 1 is removed to define the surface 5 so that the plate 6 will, when fastened in place as shown, be flush with the bottom of the undisturbed portions of the block such as the forward end surface thereof indicated at 10. Said plate 6 extends sidewardly away from the mounting block 1 and includes, preferably integral therewith, a forwardly extending arm 9 which is spaced from the mounting block 1, extends a substantial distance beyond said mounting block and terminates in any suitable manner such as the lead-in guide means 11.

A further recess is provided at the lower edge of the block 1 as shown in FIGURE 4 wherein an undercut is provided at 12, a guiding flange at 13 and a key-receiving cavity at 14.

The cutter blade 15 appears in FIGURES 5, 6 and 7 and has a mounting portion 16 and an edge portion 17. The edge portion 17 is provided with a cutting edge at 18 which forms an acute angle with the adjacent side 19 of the mounting portion 16.

The leading end of the mounting portion 16 is bevelled at 21 in a manner to fit snugly within and against the undercut 12 and the trailing end of the mounting portion 16 is provided with a further bevelled portion 22 for engagement by the hereinafter-described key.

A key 23 is of substantially rectangular shape and snugly receivable within the receptacle 14 and held therein in any convenient manner, such as by the screw 24. Said key has an extending edge 26 at the leading side thereof for overlapping the trailing edge 22 of the cutter blade insert and holding its mounting portion 16 snugly against the lower surface 27 of the mounting block 1.

With the cutter blade insert 15 positioned as shown and the key 23 firmly in place, the cutter blade is solidly bound to the mounting block 1 and the device is ready for use.

Operation

The operation is generally similar to that of the cutters in said Serial No. 227,446 and Serial No. 323,534 to which reference is made for a full description thereof. However, for convenient reference herein such operation may be briefly summarized.

Referring to FIGURE 8, the sheets A and B which are to be connected together and trimmed are held as shown by clamps which hold the sheets at one side of the fastening zone Z tightly together and hold same spaced apart as indicated at 31 on the other side of said zone Z. The tips 11 and 11a of the cutters C and C' enter between said sheets A and B by movement of the cutter-carrying means 4 and 4a forwardly as indicated by the arrow 32 in FIGURE 8. The welding electrodes 33 and 34, which are mounted on the same carriage, then follow immediately behind said tips 11 and 11a for welding said sheets together. The cutter blade edges 18 and 18a then engage the sheets A and B immediately following the electrodes for trimming off the free ends. In so doing, the leading end of the mounting block 1 will be above the sheet being severed and will act to hold said sheet against buckling upwardly as the cutter acts against same. Thus, the sheet in the position for being severed passes under the leading end of the mounting block 1 then over the cutter edge 18 and over the arm 9. Thus, the cutter will hold the sheet firmly and a clean and effective cut will be accomplished. Particularly, the cut portion will be firmly locked into the acute angle between the cutter edge 18 and the adjacent surface 19 thereof that the cutting will be carried out smoothly and accurately. The bottom cutter C', of course, operates the same but inverted.

Further, with the present design, the sharpening of individual cutter inserts is simple and replacement of the inserts 15 can be accomplished quickly and easily.

Although particular preferred embodiments of the invention have been disclosed above for illustrative purposes, it will be understood that variations or modifications in such disclosure, which come within the scope of the appended claims, are fully contemplated.

What is claimed is:

1. A cutter for use with a machine for welding together adjacent ends of strip material and severing the tag and extending beyond the zone of such welding, comprising in combination:
   a mounting block having a recess in an otherwise planar lower surface;
   a cutter blade affixed to the lower surface of said mounting block within said recess having at its lower surface coplanar with the remaining lower surface of said mounting block and including a cutting edge offset from said mounting block and positioned rearwardly from the forward end thereof and forming a acute angle with the adjacent surface of said mounting block; and
   an arm affixed to said mounting block extending in a substantially coplanar relationship with said cutter forwardly in the direction of travel of said cutter in its normal cutting operation.

2. The device defined in claim 1 wherein said arm is affixed to said mounting block directly behind said cutter blade on the side thereof remote from said mounting block and the lower surface thereof is coplanar with the lower surface of said cutter blade and the unrecessed portion of said mounting block.

3. The device defined in claim 1 wherein said cutter blade consists of a generally rectangular mounting portion and a cutting portion, said cutting portion being provided with a cutting edge forming an acute angle with respect to the adjacent edge of the fastening portion; and said mounting portion provided with means for interengagement with the mounting block.

4. The device defined in claim 3 including also a key block and a recess in said mounting block for receiving said key block, said key block having an extending lip on one edge thereof cooperating with said mounting portion for holding said mounting portion snugly against said mounting block.

5. The device defined in claim 1 wherein said arm extends forwardly in the direction of normal travel of said mounting block and has at the forward end thereof a tip extending laterally through the point directly ahead of said cutter blade.

References Cited by the Examiner

UNITED STATES PATENTS 2,393,384  1/1946  Kress _____ 83—614

FOREIGN PATENTS 116,487  5/1946  Sweden.
53,561  11/1910  Switzerland.

WILLIAM W. DYER, JR., *Primary Examiner.*

J. L. SEITCHIK, F. T. YOST, *Assistant Examiners.*